(12) United States Patent  
Satish et al.

(10) Patent No.: US 8,689,001 B1  
(45) Date of Patent: Apr. 1, 2014

(54) METHOD AND SYSTEM FOR PROTECTING USER IDENTIFICATION INFORMATION

(75) Inventors: Sourabh Satish, Fremont, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 1442 days.

(21) Appl. No.: 11/823,879

(22) Filed: Jun. 29, 2007

(51) Int. Cl.  
*H04L 29/06* (2006.01)

(52) U.S. Cl.  
USPC .............. 713/182; 713/183; 713/184

(58) Field of Classification Search  
USPC .......................... 713/182, 183, 184  
See application file for complete search history.

(56) References Cited

U.S. PATENT DOCUMENTS

| | | | |
|---|---|---|---|
| 5,832,211 A * | 11/1998 | Blakley et al. | 726/6 |
| 5,838,903 A * | 11/1998 | Blakely et al. | 726/5 |
| 7,367,053 B2 * | 4/2008 | Sanai et al. | 726/6 |
| 7,685,431 B1 * | 3/2010 | Mullany | 713/184 |
| 2002/0002607 A1 * | 1/2002 | Ludovici et al. | 709/223 |
| 2002/0052935 A1 * | 5/2002 | Paxhia et al. | 709/220 |
| 2003/0159071 A1 * | 8/2003 | Martinez et al. | 713/202 |
| 2004/0034706 A1 * | 2/2004 | Cohen et al. | 709/225 |
| 2004/0073815 A1 * | 4/2004 | Sanai et al. | 713/202 |
| 2004/0250141 A1 * | 12/2004 | Casco-Arias et al. | 713/202 |
| 2006/0274356 A1 * | 12/2006 | Bellagamba et al. | 358/1.15 |
| 2009/0024487 A1 * | 1/2009 | Mehregany | 705/26 |
| 2010/0114560 A1 * | 5/2010 | Spataro | 704/9 |

\* cited by examiner

*Primary Examiner* — Bradley Holder  
(74) *Attorney, Agent, or Firm* — Wilmer Cutler Pickering Hale and Dorr LLP

(57) ABSTRACT

A method and system for protecting identity information comprises determining identity information required by a resource utilized by a user, determining strength of the identity information used by the user to access the resource, and performing an action in view of the strength.

20 Claims, 2 Drawing Sheets

METHOD AND SYSTEM FOR PROTECTING USER IDENTIFICATION INFORMATION

BACKGROUND OF THE INVENTION

1. Field of the Invention

Embodiments of the present invention generally relate to network computing and, more particularly, to a method and system for protecting user identification information within a network environment.

2. Description of the Related Art

Present day computer systems connect and exchange information extensively through telecommunications networks, such as the Internet. These interactions involve many transactions that may require a user's identity information such as, for example, login information, passwords, social security information or other user credentials, to be disclosed. This user identity information is sometimes under threat due to malicious agents or social attacks such as phishing attacks, in which a "phisher" misguides a user to fake website that looks substantially identical to a genuine website. Thereafter, the user is required to disclose his or her identity information to the phishing website. In this way, the user security information is thus compromised and this information may then be used by the phisher for purposes malicious to or undesirable for the user.

While phishing is a relatively recent phenomenon, the intensity and the sophistication of phishing attacks have increased significantly in the past few years. Most users tend to have passwords that are derived from a user's personal information including date of birth, spouse's name, among others, and such passwords are generally classified as having low strength, that is, are considered easily decipherable, especially by attacks also generally categorized as "brute force" attacks. Further vulnerability is introduced by user habits, such as sharing the same password across various websites. So, for example, a user may have the same login information in an email account as with his or her bank, and in case a phishing attack is successful on the email account, the security of the user's bank account may also be compromised. Even though the individual password may be strong, the repeated use of the password reduces its strength. Phishers or other malicious agents exploit this human trait to fetch the user credentials.

Accordingly, there exists a need for a method and system that strengthen a user's password or other login information in a holistic manner.

SUMMARY OF THE INVENTION

Embodiments of the present invention comprise a method and system for improving the protection of user identity information. One embodiment of the invention is a method and system for protecting identity information comprising determining identity information required by a resource visited by a user, determining strength of the identity information used by the user to access the resource, and performing an action in view of the strength of the identity information.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the word "a" means "at least one" unless otherwise mentioned.

DETAILED DESCRIPTION

Figure 1:
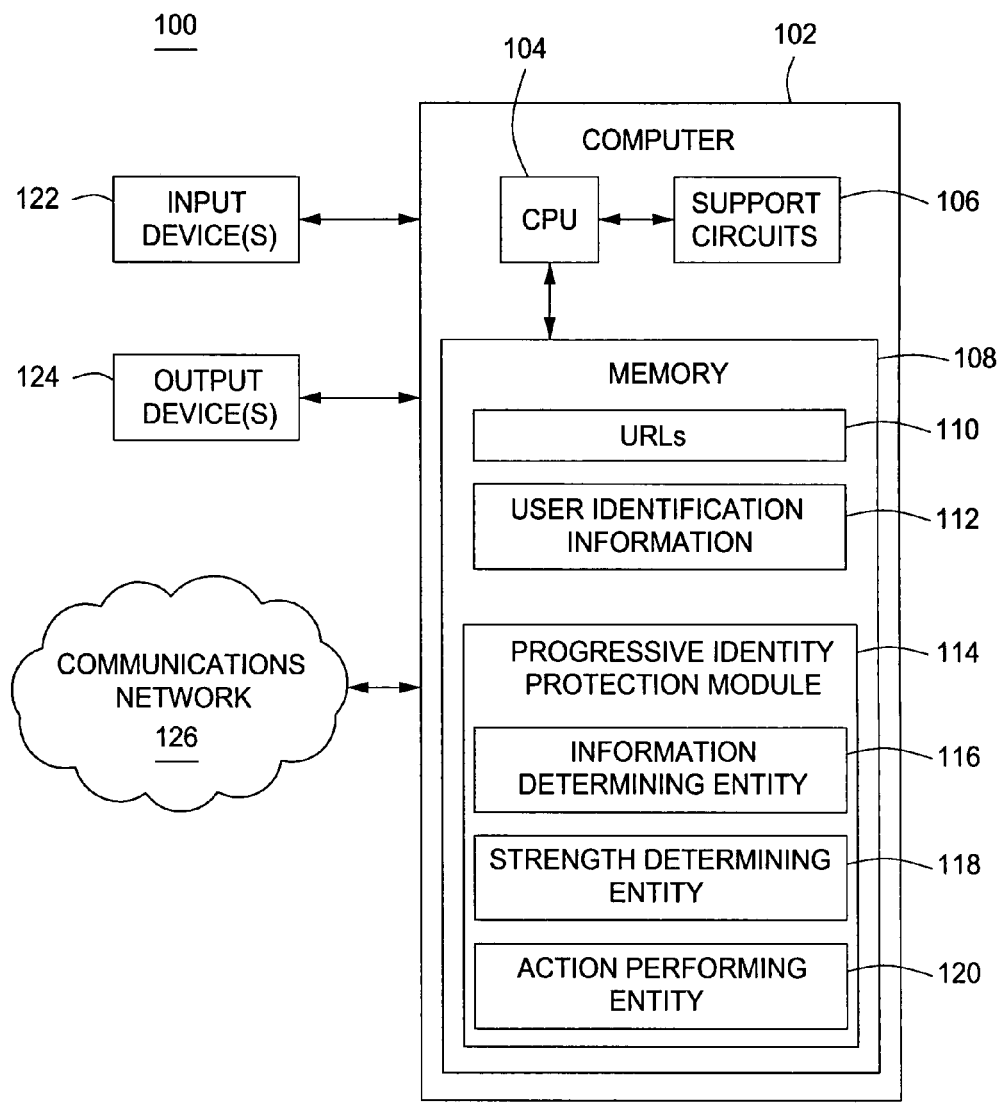
FIG. 1 is a block diagram of a computer system according various embodiments of the present invention.

FIG. 1 is a block diagram of a computer system 100 according various embodiments of the present invention. The computer system 100 comprises a computer 102 that is capable of executing applications and connected to a communication network 126. The network 126 generally forms a portion of the Internet which may comprise various sub-networks such as Ethernet networks, local area networks, wide area networks, wireless networks, and the like. The computer 102 comprises, without limitation, input/output devices, such as an input device 122 and an output device 124, a CPU 104, support circuits 106, and a memory 108. The CPU 104 may be one or more of any commercially available microprocessors or microcontrollers. The support circuits 106 comprise circuits and devices that are used in support of the operation of the CPU 104. For example, the input device 122, the output device 124, the CPU 104, and the memory 108 are interconnected through the support circuits 106. Such support circuits include, for example, cache, input/output circuits, communications circuits, clock circuits, power supplies, system bus, PCI bus and the like. Those skilled in the art will appreciate that the hardware depicted in the FIG. 1 may vary from one computer system to another. For example, other peripheral devices, such as optical disk drives, graphics card, data storage devices, various other input devices and the like, may also be used in addition to or in place of the hardware depicted.

Various types of software processes or modules and information are resident within the memory 108. The memory 108 may comprise random access memory, read only memory, removable storage, optical storage and the like. In one embodiment of the invention, a software module (a progressive identification protection module 114) is stored in memory 108. The module 114 is a set of instructions executed by CPU 104 to perform a method in accordance with at least one embodiment of the invention. The module 114 may be a stand alone software program or may be a portion of a larger program such as password management software. The module 114 further includes an information determining entity 116 configured to determine identity information required by a resource visited or otherwise utilized by a user, a strength determining entity 118 configured to determine strength of the identity information used by the user to access the resource, and an action performing entity 120 configured to perform an action in view of the strength so determined. The resources are generally identified by a universal resource locator (URL) or other unique resource identifier. The resources may be any computer resource that requires authorization to utilize the resource, for example, websites, peripherals, network resources, remote storage, and the like. The module 114 may further be configured to track and store user identification information in a password storage module (not shown in the figures), for example user identification information (login information, password, user credentials) used to access one or more resources. It is appreciated that in other embodiments, the module 114 may be implemented as individual hardware components (not shown) within the computer 102. The individual hardware components may be specifically configured to provide functionalities for the entities 116, 118 or 120.

Figure 2:
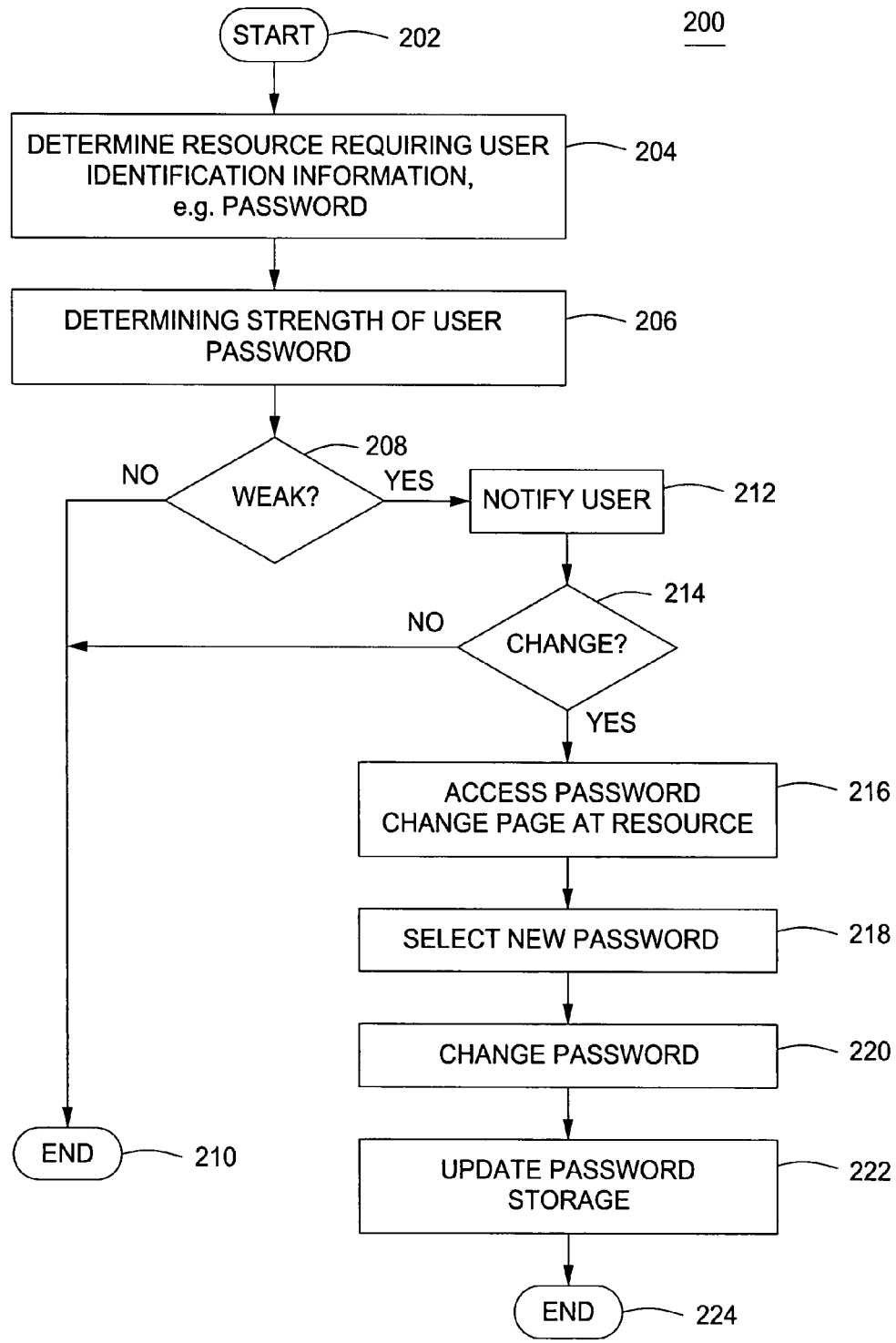
FIG. 2 is a flow chart illustrating a method for protecting user identity information according to various embodiments of the present invention.

According to another embodiment of the present invention, a method for protecting identity information includes determining identity information required by a resource visited by a user, determining strength of the identity information used by the user to access the resource, and performing an action in view of the strength so determined. FIG. 2 depicts a flow diagram of a method 200 in accordance with one embodiment of the present invention. The method 200 begins at step 202, and proceeds to step 204, at which identity information required by a resource visited by a user is determined. For example, the information determining entity 116 may identify a password or a user name element of the user identity information. At step 206, a determination is made as to the strength of the identity information used by the user to access the resource, and for example, the password strength may be determined. This determination may be made at various instances, and in one embodiment, by the information determining entity 116. For example, according to one embodiment, the determination of step 204 is user invoked. According to another embodiment, the determination of step 204 is scheduled to occur at specific times. According to another embodiment, the determination of step 204 is scheduled to be triggered by a subscription invoked message, for example, in view of an identity theft attack that poses a present high risk. The method 200 may also be invoked via a general on-line identity threat alert or phishing alert, or whenever there is an alert pertaining to sites at which a user has an identity. Upon being alerted, the user may manually invoke method 200 or configure the invention to invoke method 200 automatically to act on behalf of the user. As such, the user's identity information is proactively protected. Once invoked, method 200 performs the following process for all the sites that are currently being phished or otherwise attacked, thus maintaining a high security posture for the user's identity.

The password strength may be determined using one or more factors. One of such factors includes the similarity of the password with other user information such as the user's name, address, spouse name and the like. Another factor includes general length of the password string, while yet another may include whether the password string is a combination of alphanumeric characters or only alphabetical or only numeric. Those skilled in the art will appreciate that password strength may be determined using the above information in various ways, and using various apparent criterion. For example, a password with only alphabetical or only numeric letters is weaker than a password of the same length having an alphanumeric combination.

Further, a password similar to, even if partially, a user's personal information would also be, in general, categorized as weaker than a password without the user's personal information. It is appreciated that all such apparent factors and criterion will be readily apparent to those skilled in the art and are included within the scope of the claims appended hereto. Yet another factor for assessing password strength in the context of general online presence protection includes assessing whether the same password has been used to log on to a plurality of other resources. For example, the same password used for accessing more than one resource will, in general, be weaker than unique passwords for each resource.

Based on these factors, the decision is made at step 208 as to whether the password is weak or not. Thereafter, an action is performed in view of the password strength so determined. The action performed has two possibilities depending upon the decision made at step 208. If at step 208, the password is determined as not weak (option "NO"), the method 200 ends at step 210. If however, at step 208, the determination is that the password is weak (option "YES"), the method 200 proceeds to step 212 at which a user may be notified of a weak password determination. The notification may be made, for example, by the action performing entity 120. The method 200 proceeds to step 214 where a decision is made as to whether the password should be changed or not, i.e., the password is deemed so weak that it represents a security risk. This decision may be made in a variety of ways. For example, a prompt may be displayed to the user asking permission to change the password in view of the weak determination. As an alternate, the decision may be made based on a stored (or otherwise known) user preference to automatically change the password on such a determination.

If the decision is to not change the password (option "NO"), the method 200 ends at the step 210. However, if at the step 214, the decision is to change the password, the method 200 proceeds to step 216, at which the password change page of the concerned resource is accessed, for example, by the action performing entity 120. At step 218, a new password is selected. The new password may be selected, for example, based on the various factors as discussed above and configured to be strong on the various criteria. For example, the new password may be selected such that it does not contain user personal information, or may have a greater length, or may include alphanumeric characters or may be unique across various resources accessed by the user, or any combination of the above. According to one embodiment, the password may be changed based on new information received from a subscription message in view of an identity theft attack that poses a high security risk. For example, a new encrypting algorithm may be received from the subscription service to generate a new password. The user may be presented with a plurality of suggested passwords from which to select a password to be used. Alternatively, the password may be automatically generated and automatically used to update the password used by the resource. As another alternative, the user may manually generate their new password, and the module 114 may test the new password for strength as discussed above. Once a new password is selected at the step 220, at step 222 password storage is updated with this new password, and the method 200 ends at step 224.

The method 200 may be implemented by a module, such as the progressive identity protection module 114 of FIG. 1. Further, according to certain embodiments, the module 114 may be installable on the computer system 102 by a user. When a user accesses a specific resource, the information determining entity 116 tracks the user identity information used to access that resource to determine the strength of the password in accordance with various embodiments discussed herein. The strength is determined by the strength determining entity 118. On determination of a weak password, the user may be prompted, or an automatic decision is made based on user preference, to change the password. A subscription service message, communicating with the module 114, may alert on a recent phishing attack, and this may also trigger the user to be prompted, or a decision based on user preference, for a change of the password. A new password is selected accordingly to provide a new password with increased strength, and the old password is changed with the new password, in one embodiment by the by the action performing entity 120. According to certain embodiments, the module 114 is configured to track multiple resources accessed by the user for user identification information and further configured to asses the password strength in view of the information assimilated by tracking across various resources.

There might be situations where password change cannot be completely automatically performed by an embodiment of the invention, for example, on sites that do not have a known password change page and/or that might have a "captcha" like feature on a password change page. However, even for such sites, the user shall be notified of issues and may be helped through the password change process as much as possible. For example, the user may be alerted to the password weakness and instructed how to resolve the weakness issue and generate unique/strong passwords.

Alternatively, some sites may be willing to open up secure interfaces for password change operations to be performed silently. Under such availability, the password change process could be performed without any unexpected glitches. This process may only be repeated or applicable to sites that are strongly and securely identified via a certificate from a trusted issuer.

While the invention has been described with reference to passwords, which are a part of the user identification information, various aspects of the invention described herein are not limited to passwords, and are similarly applicable to other elements of user identification information. All such variants are included within the scope of the present invention.

Those skilled in the art will appreciate that the methods and systems disclosed herein advantageously help users, particularly a common user, protect their identity information against common security threats, in a preemptive manner, with a higher level of reliability. Further, embodiments of the invention advantageously provide for creating and storing strong passwords to access various resources, thus saving the user the burden of creating multiple complex passwords and memorizing the same. Further, embodiments of the present invention provide for changing the user identification information in view of present or ongoing threats through a subscription service, which may advantageously alert and protect users who are not generally informed about such threats.

While the foregoing is directed to embodiments of the present invention, other and further embodiments of the invention may be devised without departing from the basic scope thereof, and the scope thereof is determined by the claims that follow.

The invention claimed is:

1. A method for protecting identity information comprising:
    determining, via at least one computer processor, identity information required by a resource utilized by a user amongst a plurality of resources utilized by the user, wherein the at least one computer processor is separate from the resource utilized by the user, wherein the plurality of resources comprise a plurality of websites, and wherein the identity information comprises at least one of a user name or a password;
    determining a strength of the identity information used by the user to access the resource by tracking a plurality of resources accessed by the user and determining the strength as weak if the identity information is common between the plurality of resources accessed by the user or if the identity information is derived from a user's personal information, wherein access is achieved via a provision of identity information by the user to the resource to be accessed; and
    performing an action in view of the strength, wherein performing an action comprises one or more of preventing the user from providing the identity information to the resource utilized by the user, identifying a stored user preference, notifying the user, generating new identity information for the user, providing new identity information to the user, prompting the user to generate new identity information, performing a change of identity information at the resource utilized by the user, receiving an alert from a subscription service;
    wherein determining the identity information is initiated by one or more of: the user, according to a predetermined time schedule, in response to a subscription invoked message, and in response to an identity threat alert.

2. The method of claim 1, wherein the notification comprises an indicia of the strength of the identity information.

3. The method of claim 1, wherein the action comprises:
    accessing a password change page of the resource having a weak strength;
    selecting a new password; and
    changing a password to the new password using the password change page.

4. The method of claim 1, wherein the resource is identified by a universal resource locator (URL).

5. The method of claim 1, wherein the resource comprises a computer resource that requires authorization to utilize.

6. The method of claim 1, wherein the new identity information provided to the user includes both alphabetical and numeric characters.

7. The method of claim 1, wherein the new identity information provided to the user excludes user personal information.

8. The method of claim 1, wherein a new encrypting algorithm is used to generate new identity information.

9. The method of claim 1, further comprising testing the new identity information generated by the user for a strength of the new identity information.

10. The method of claim 1, wherein the resource at which a change of identity information is performed is identified by a certificate from a trusted issuer.

11. A system for protecting identity information, the system comprising:
    an information determining entity including instructions for determining, via at least one computer hardware processor, identity information required by a resource utilized by a user amongst a plurality of resources utilized by the user, wherein the at least one computer hardware processor is separate from the resource utilized by the user, wherein the plurality of resources comprise a plurality of websites, and wherein the identity information comprises at least one of a user name or a password;
    a strength determining entity including instructions for determining the strength of the identity information used by the user to access the resource by tracking a plurality of resources accessed by the user and determining the strength as weak if the identity information is common between the plurality of resources accessed by the user or if the identity information is derived from a user's personal information, wherein access is achieved via a provision of identity information by the user to the resource to be accessed; and an action performing entity including instructions for performing an action in view of the strength, wherein performing an action comprises one or more of preventing the user from providing the identity information to the resource utilized by the user, identifying a stored user preference, notifying the user, generating new identity information for the user, providing new identity information to the user, prompting the user to generate new identity information, performing a change of identity information at the resource utilized by the user, receiving an alert from a subscription service;

wherein determining the identity information is initiated by one or more of: the user, according to a predetermined time schedule, in response to a subscription invoked message, and in response to an identity threat alert.

12. The system of claim 11, wherein the notification comprises an indicia of the strength of the identity information.

13. The system of claim 11, wherein the action performing entity is configured to perform the steps comprising:
   accessing a password change page of the resource having weak strength;
   selecting a new password; and
   changing a password to the new password using the password change page.

14. The system of claim 11, wherein the resource is identified by a universal resource locator (URL).

15. The system of claim 11, wherein the resource comprises a resource that requires authorization to utilize.

16. A non-transitory computer-readable storage medium comprising:
   instructions executable by at least one computer processor to cause the at least one computer processor to:
      determine identity information required by a resource utilized by a user amongst a plurality of resources utilized by the user, wherein the at least one computer processor is separate from the resource utilized by the user, wherein the plurality of resources comprise a plurality of websites, and wherein the identity information comprises at least one of a user name or a password;
      determine a strength of the identity information used by the user to access the resource by tracking a plurality of resources accessed by the user and determining the strength as weak if the identity information is common between the plurality of resources accessed by the user or if the identity information is derived from a user's personal information, wherein access is achieved via a provision of identity information by the user to the resource to be accessed; and
      perform an action in view of the strength, wherein performing an action comprises one or more of preventing the user from providing the identity information to the resource utilized by the user, identifying a stored user preference, notifying the user, generating new identity information for the user, providing new identity information to the user, prompting the user to generate new identity information, performing a change of identity information at the resource utilized by the user, receiving an alert from a subscription service;
   wherein determining the identity information is initiated by one or more of: the user, according to a predetermined time schedule, in response to a subscription invoked message, and in response to an identity threat alert.

17. The non-transitory computer readable storage medium of claim 16, wherein the notification comprises an indicia of the strength of the identity information.

18. The non-transitory computer readable storage medium of claim 16, wherein the action comprises:
   accessing a password change page of the resource having a weak strength;
   selecting a new password; and
   changing a password to the new password using the password change page.

19. The non-transitory computer readable storage medium of claim 16, wherein the resource is identified by a universal resource locator (URL).

20. The non-transitory computer readable storage medium of claim 16, wherein the resource comprises a computer resource that requires authorization to utilize.

* * * * *